United States Patent
Xu et al.

(10) Patent No.: US 9,197,305 B2
(45) Date of Patent: Nov. 24, 2015

(54) PRECODING CONTROL INDICATION FEEDBACK METHOD, USER EQUIPMENT, AND BASE STATION

(71) Applicant: Huawei Technologies Co., Ltd., Shenzhen (CN)

(72) Inventors: Wenying Xu, Shanghai (CN); Xueli Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 14/266,579

(22) Filed: Apr. 30, 2014

(65) Prior Publication Data
US 2014/0233513 A1    Aug. 21, 2014

Related U.S. Application Data

(63) Continuation of application No. PCT/CN2012/083660, filed on Oct. 29, 2012.

(30) Foreign Application Priority Data

Nov. 1, 2011    (CN) .......................... 2011 1 0340047

(51) Int. Cl.
*H04B 7/06*    (2006.01)
*H04B 7/04*    (2006.01)

(52) U.S. Cl.
CPC .............. *H04B 7/061* (2013.01); *H04B 7/0413* (2013.01); *H04B 7/0621* (2013.01); *H04B 7/0689* (2013.01); *H04B 7/0456* (2013.01); *H04B 7/063* (2013.01); *H04B 7/0608* (2013.01); *H04B 7/0623* (2013.01)

(58) Field of Classification Search
CPC ............ H04B 7/06; H04B 7/04; H04B 7/061; H04B 7/0621; H04B 7/0413
See application file for complete search history.

(56) References Cited

U.S. PATENT DOCUMENTS

| 2012/0300656 | A1 | 11/2012 | Cui et al. |
| 2012/0307754 | A1 | 12/2012 | Shi et al. |
| 2013/0021897 | A1 | 1/2013 | Wu et al. |

FOREIGN PATENT DOCUMENTS

| CN | 101558594 A | 10/2009 |
| CN | 101801097 A | 8/2010 |
| CN | 101931508 A | 12/2010 |

(Continued)

OTHER PUBLICATIONS

3GPP: Multiplexing and Channel Coding (FDD) (Release 5), Technical Specification, TS 25.212 V5.10.0, Jun. 2005, 72 pages.

(Continued)

*Primary Examiner* — Anez Ebrahim
(74) *Attorney, Agent, or Firm* — Slater & Matsil, L.L.P.

(57) ABSTRACT

Embodiments of the present invention disclose a precoding control indication feedback method, a user equipment, and a base station. Channel capacity values corresponding to precoding matrices in a precoding matrix set are calculated. A sequence number of a precoding matrix corresponding to a maximum channel capacity value is used as a PCI to be used. The PCI to be used, a CQI indicating downlink channel quality, and ACK/NACK indicating a data decoding result are borne over an uplink HS-DPCCH. The same are fed back to a corresponding base station node to instruct the base station node to select a MIMO single-stream manner or a single-antenna manner to send data to be sent.

18 Claims, 6 Drawing Sheets

(56) References Cited

FOREIGN PATENT DOCUMENTS

| CN | 101932109 A | 12/2010 |
| CN | 102208969 A | 5/2011 |
| CN | 102158263 A | 8/2011 |
| CN | 102170664 A | 8/2011 |

OTHER PUBLICATIONS

3GPP: Multiplexing and channel coding (FDD) (Release 7), Technical Report, TS 25.212 V7.12.0, Mar. 2014, 103 pages.

US 9,197,305 B2

PRECODING CONTROL INDICATION FEEDBACK METHOD, USER EQUIPMENT, AND BASE STATION

This application is a continuation of International Application No. PCT/CN2012/083660 filed on Oct. 29, 2012, which claims priority to Chinese Patent Application No. 201110340047.9, filed on Nov. 1, 2011, both of which are hereby incorporated by reference in their entireties.

TECHNICAL FIELD

The present invention relates to the field of multiple input and multiple output MIMO communications technology and in particular embodiments, to a precoding control indication feedback method, a user equipment, and a base station.

BACKGROUND

MIMO (Multiple Input Multiple Output) technology refers to the use of multiple antennas at both the transmitter and receiver to make full use of multipath components in space transmission and to use multiple data channels to send signals on the same frequency band, thereby linearly increasing channel capacity as the number of antennas increases. Such increase in the channel capacity consumes no additional bandwidth or additional transmit power. Therefore, it is an efficient means to increase the channel and system capacity.

In the MIMO technology, a base station node NodeB sends data to a user node UE over a physical HS-DSCH (High Speed Downlink Shared Channel), and sends control signaling and the like related to the HS-DSCH to the UE over an HS-SCCH (High Speed Shared Control Channel). The UE performs demodulation and decoding and the like on the data on the HS-DSCH by using control information carried on the HS-SCCH. Then, the UE generates ACK/NACK information according to the reception status over the HS-SCCH and based on whether the data on the HS-DSCH is decoded successfully. In addition, the UE also measures downlink channel status, generates CQI (channel quality indicator) information, selects a precoding matrix that allows a maximum channel capacity in a precoding matrix set of a precoding protocol, and generates a PCI (precoding control indication) according to a sequence number of the precoding matrix. The UE bears the ACK/NACK information, CQI information, and PCI information over an HS-DPCCH (uplink high-speed dedicated physical control channel) channel, and sends these information to the NodeB. The NodeB may use the CQI information fed back by the UE as a basis for service scheduling, perform precoding processing, according to the precoding matrix corresponding to the reported PCI, on the data to be sent, and select a corresponding transmit antenna according to a precoding processing result to send the data to the UE.

In an application of the MIMO technology, data transmission manners of a single stream and multiple streams are available. The single stream refers to that each transmit antenna sends the same data block, and the multiple streams refer to that each transmit antenna sends different data blocks. During data transmission, a base station switches between single stream and multiple streams according to actual situation about channel quality, thereby ensuring power requirements on the receiver. With regard to the single-stream transmission manner, because of location changes of the transmit antennas or channel quality, and the like, a big difference is caused between shadow attenuations experienced by the transmit antennas for sending data; or when antenna polarization directions are inconsistent, the receive power on the receiver may be extremely imbalanced, or an extreme scenario may exist, where the receiver can receive the power of only one transmit antenna. These may result in a probabilistic negative gain on the MIMO single stream compared with a conventional single-transmitting HSDPA (high speed downlink packet access), thereby affecting communication quality.

SUMMARY OF THE INVENTION

In order to solve the above technical problem, embodiments of the present invention provide a precoding control indication feedback method, a user equipment, and a base station. The technical solutions are as follows:

In one aspect, an embodiment of the present invention provides a precoding control indication feedback method. Channel capacity values corresponding to precoding matrices in a precoding matrix set are calculated. A channel capacity value corresponds to a precoding matrix. A sequence number of a precoding matrix corresponding to a maximum channel capacity value issued as a precoding control indication (PCI) to be used. The PCI to be used, a channel quality indication (CQI) indicating downlink channel quality, and ACK/NACK indicating a data decoding result is bore over an uplink high-speed dedicated physical control channel (HS-DPCCH). The PCI, the CQI and the ACK/NACK are Fed back to a corresponding base station node to instruct the base station node to select a MIMO single-stream manner or a single-antenna manner to send data to be sent. The precoding matrix set includes antenna switching precoding matrices and original precoding matrices in a precoding protocol. The antenna switching precoding matrices enable a result of precoding processing performed by the base station node on the data to be sent to be one-dimensional data, thereby using the single-antenna manner to send the data to be sent.

In another aspect, an embodiment of the present invention further provides a precoding control indication feedback method. Feedback information is sent by a user node over an uplink high-speed dedicated physical control channel (HS-DPCCH). The feedback information includes a PCI to be used, a channel quality indication (CQI) indicating downlink channel quality, and ACK/NACK indicating a data decoding result. A current precoding matrix in a precoding matrix set corresponding to the PCI to be used is obtained. Using the current precoding matrix, precoding processing on data to be sent is performed. When a precoding processing result is one-dimensional data, single-antenna manner is selected to send the data to be sent.

An embodiment of the present invention further provides a user equipment, including a precoding control indication feedback system.

The precoding control indication feedback system includes a channel capacity calculating module, which is configured to calculate channel capacity values corresponding to precoding matrices in a precoding matrix set. A channel capacity value corresponds to a precoding matrix. A PCI determining module is configured to use a sequence number of a precoding matrix corresponding to a maximum channel capacity value as a PCI to be used. A feedback information sending module is configured to bear the PCI to be used, a channel quality indication CQI indicating downlink channel quality, and ACK/NACK indicating a data decoding result over an uplink high-speed dedicated physical control channel (HS-DPCCH), and to feed back the PCI, the CQI and the ACK/NACK to a corresponding base station node to instruct the base station node to select a MIMO single-stream manner or a single-antenna manner to send data to be sent. The precoding matrix set includes antenna switching precoding matrices and original precoding matrices in a precoding protocol; and the antenna switching precoding matrices enable a result of precoding processing performed by the base station node on the data to be sent to be one-dimensional data, thereby using the single-antenna manner to send the data to be sent.

An embodiment of the preset invention further provides a base station, including a data precoding system.

The data precoding system includes:

a feedback information receiving module, configured to receive feedback information which is sent by a user node over an uplink high-speed dedicated physical control channel (HS-DPCCH), where the feedback information includes a PCI to be used, a channel quality indication (CQI) indicating downlink channel quality, and ACK/NACK indicating a data decoding result;

a precoding matrix determining module, configured to obtain a current precoding matrix in a precoding matrix set corresponding to the PCI to be used;

a precoding module, configured to perform, by using the current precoding matrix, precoding processing on data to be sent; and an analysis processing module, configured to select, when a precoding processing result is one-dimensional data, a single-antenna manner to send the data to be sent.

In the technical solutions provided in the embodiments of the present invention, antenna switching precoding matrices are added to an original precoding matrix set; when a user node constructs a PCI, all precoding matrices are traversed, and a sequence number of a precoding matrix of a maximum channel capacity is used as a PCI value which is borne over HS-DPCCH together with a CQI and ACK/NACK and sent to a base station node, thereby instructing the base station node to select a MIMO single-stream manner or a single-antenna manner according to situation of a channel to be used to send data. Compared with the prior art, by using the manner of adding the antenna switching precoding matrices, the base station node is enabled to select a data transmission manner suitable for the channel to be used according to the PCI fed back by the user node, thereby efficiently reducing the probabilistic negative gain that may occur on the MIMO single stream compared with the conventional single-transmitting HSDPA, and improving communication quality.

BRIEF DESCRIPTION OF THE DRAWINGS

To describe the technical solution in the embodiments of the present invention more clearly, the following briefly introduces the accompanying drawings needed for describing the embodiments or the prior art. Apparently, the accompanying drawings in the following description show merely some embodiments of the present invention, and persons of ordinary skill in the art may still derive other drawings from the accompanying drawings without creative efforts.

DETAILED DESCRIPTION OF ILLUSTRATIVE EMBODIMENTS

The following clearly describes the technical solution of the present invention with reference to the accompanying drawings. Apparently, the described embodiments are merely a part rather than all of the embodiments of the present invention. All other embodiments obtained by persons of ordinary skill in the art based on the embodiment of the present invention without creative efforts shall fall within the protection scope of the present invention.

In a multiple input multiple output MIMO system, as for a MIMO single-stream transmission manner, because of location changes in each transmit antenna or channel quality, there is a big difference between shadow attenuation experienced by each transmit antenna for sending data; or when antenna polarization directions are inconsistent, power of each transmit antenna received by a user node as a receiver may be extremely imbalanced, or an extreme scenario may even exist where the user node can receive the transmit power of only one transmit antenna. These may result in a probabilistic negative gain on the MIMO single stream compared with a conventional single-transmitting HSDPA, thereby greatly affecting communication quality. In order to solve the problem in the prior art, embodiments of the present invention provide a precoding control indication feedback method, a user equipment, and a base station, so that a base station node selects a suitable data transmission node according to an actual situation of a channel to send data, thereby efficiently improving communication quality.

The precoding control indication feedback method provided by the present invention is described first as follows.

Figure 1:
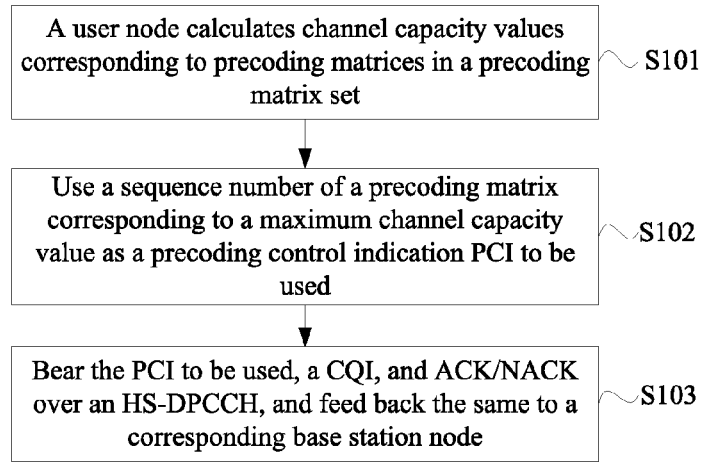
FIG. 1 is a first flowchart of a precoding control indication feedback method according to an embodiment of the present invention.

The description is made from the view of a user node. A precoding control indication feedback method, as shown in FIG. 1, may include the following steps.

S101. A user node calculates channel capacity values corresponding to precoding matrices in a precoding matrix set.

In a MIMO system, a base station node send data to a user node through a physical HS-DSCH, and send control signaling and the like related to the HS-DSCH through an HS-SCCH. The user node performs demodulation and decoding and the like on the data on the HS-DSCH by using control information transmitted over the HS-SCCH. Then, the user node generates ACK/NACK information according to the receipt result of data information on the HS-SCCH and whether the data on the HS-DSCH is decoded successfully. In addition, the user node also measures a downlink channel status and generates channel quality indication CQI information. Meanwhile, the user node may traverse each precoding matrix in a precoding matrix set that is set by negotiating with the base station node, and calculate channel capacity values corresponding to each precoding matrix, thereby determining a precoding control indication PCI later according to sizes of the channel capacity values.

The precoding matrix set that is set in advance includes antenna switching precoding matrices and original precoding matrices in a precoding protocol. The antenna switching precoding matrices enable a result of precoding processing performed by the base station node on the data to be sent to be one-dimensional data, thereby using the single-antenna manner to send the data to be sent. It may be understood that the original precoding matrices in the precoding protocol may make a result of precoding processing performed by the base station node on the data to be sent be multidimensional data corresponding to the number of base station transmit antennas, thereby using a MIMO single-stream manner to send the data to be sent.

The way of calculating the channel capacity values corresponding to precoding matrices in the precoding matrix set that is set in advance may be the following steps.

S101a. Determine a signal-to-noise ratio SNR corresponding to a precoding matrix in the precoding matrix set in the current channel.

It should be noted that, in this embodiment, an SNR, a signal-to-interference ratio SIR, and a signal to interference plus noise ratio SINR are collectively referred to as the SNR. The way of calculating the SNR may be:

SNR=Meaningful signal energy/Noise energy

Assume that the system is y=hvx+n, where y is a receiving signal matrix, x is a sending signal matrix, h is a radio channel matrix, v is a precoding matrix, and n is a noise matrix, then $SNR=|hvx|^2/|n|^2$.

Persons in the art may understand that the way of calculating the SNR is not limited to the method of this embodiment.

S101b. Substitute the SNR in a MIMO single-stream channel capacity formula to determine a channel capacity value corresponding to the precoding matrix.

The MIMO single-stream channel capacity formula is:

$$C_i = \log_2(1 + SNR_i) \quad (1),$$

where $C_i$ is a channel capacity value corresponding to a precoding matrix whose sequence number is i, and $SNR_i$ is an SNR corresponding to the precoding matrix whose sequence number is i.

It should be noted that the way of calculating the channel capacity value is not limited to the above manner. It is reasonable to select other calculating ways according to different application scenarios.

S102. Use a sequence number of the precoding matrix corresponding to the maximum channel capacity value as a precoding control indication PCI to be used.

When a channel capacity value to be used corresponding to a precoding matrix is the maximum one, it indicates that if the base station node performs precoding processing on the data to be sent according to this precoding matrix and then sends the data to be sent, throughput obtained thereby is greater than throughput obtained by performing the same processing by using other precoding matrices, so that relative better communication quality is achieved.

Therefore, after traversing one by one the precoding matrices in the precoding matrix set that is set in advance, a sequence number of a precoding matrix corresponding to the maximum channel capacity value is selected as a precoding control indication PCI to be used. It should be noted that all matrices in the precoding matrix set that is set in advance are consecutively numbered according to a specific sequence. For example, if there are 6 precoding matrices, the consecutive sequence numbers may be 000, 001, 010, 011, 100, and 101. That is, each precoding matrix corresponds to a unique sequence number. Meanwhile, both the user node and the base station node are aware of a mapping relationship between the precoding matrices and the sequence numbers.

S103. Bear the PCI to be used, a channel quality indication CQI, and ACK/NACK over an HS-DPCCH and feed back the same to the corresponding base station node, so as to instruct the base station node to select a MIMO single-stream manner or a single-antenna manner to send the data to be sent.

After the user node constructs the precoding control indication PCI to be used according to the channel capacity, the PCI to be used, a channel quality indication CQI indicating downlink channel quality, and ACK/NACK indicating a data decoding result are borne over an uplink high-speed dedicated physical control channel HS-DPCCH as feedback information and are fed back to the corresponding base station node, thereby instructing the base station node to perform subsequent data transmission.

It may be understood that, because specific antenna switching precoding matrices are added on the basis of the original precoding matrices in the precoding protocol, bits in a specific number need to be added to the PCI to be used for supporting the expansion of the matrix codebook. The number of bits to be added depends on the number of added antenna switching precoding matrices, so that the total bits corresponding to the PCI to be used may identify a sequence number of each precoding matrix in the preset precoding matrix set.

Further, before the PCI is fed back to the base station node, the PCI needs to be coded together with the CQI, and be borne over the HS-DPCCH together with ACK/NACK; therefore, in cases that the number of bits corresponding to the PCI to be used is increased, corresponding change needs to be made for bearing the PCI to be used, CQI, and ACK/NACK, which specifically may be the following four manners.

(1) Keep the existing PCI feedback period of the precoding protocol unchanged and change the scheme of jointly coding the CQI and the PCI, so that the total number of bits after the joint coding remains unchanged. This way may specifically be using a preset CQI/PCI joint coding manner in which the total number of bits after joint coding of the CQI and the PCI to be used remains unchanged, to perform joint coding on the CQI and the PCI to be used, and bearing a coding result and ACK/NACK over the HS-DPCCH according to an original information bearing manner.

In this manner, the joint coding scheme the CQI and the PCI is reset, so that after the joint coding on the PCI to be used and the CQI, compared with that using the original joint coding scheme, the total number of bits of the joint coding result remains unchanged, and the joint coding result is then borne over the HS-DPCCH together with ACK/NACK according to the original information bearing manner.

(2) Keep the scheme of jointly coding the CQI and the PCI in the existing precoding protocol, and increase the feedback period of the PCI to be used. This scheme may specifically be distributing bits corresponding to the PCI to be used into multiple consecutive original CQI/PCI joint coding according to a preset ratio, and bearing each joint coding result and ACK/NACK over the HS-DPCCH according to the original information bearing manner.

In this manner, the scheme of jointly coding the CQI and the PCI is not changed, and bits corresponding to the PCI to be used are distributed into multiple consecutive joint coding according to a specific ratio, and each coding result and ACK/NACK are borne over the HS-DPCCH according to the original information bearing manner. It may be understood that, in a case where the number of bits corresponding to the PCI is insufficient during joint coding, specific bits may be supplemented, thereby meeting requirements of joint coding.

(3) Keep the scheme of jointly coding the CQI and the PCI in the existing precoding protocol, shorten the feedback period of the PCI to the utmost, and feed back the PCI to be used efficiently. This manner may specifically be distributing bits corresponding to two PCIs to be used into multiple consecutive original CQI/PCI joint coding in a unit of the original number of bits of the PCI, and bearing each joint coding result and ACK/NACK over the HS-DPCCH according to the original information bearing manner.

In this manner, by using the manner of distributing the bits corresponding to two PCIs to be used into multiple consecutive original CQI/PCI joint coding according to a unit of the original number of bits corresponding to the PCIs, the feedback period of the PCI to be used is shortened to the utmost, thereby achieving the objective of effectively feeding back the PCI to be used.

(4) Keep the scheme of jointly coding the CQI and the PCI in the existing precoding protocol, sufficiently use protocol field resources, and feed back the PCI to be used efficiently. This manner may specifically be performing joint coding on the original number of bits of a PCI in the PCI to be used and the CQI according to the original CQI/PCI joint coding manner, bearing a joint coding result and ACK/NACK over the HS-DPCCH according to the original information bearing manner, and meanwhile, bearing remaining bits of the PCI to be used over an idle field of a DPCCH (dedicated physical control channel) periodically adjacent to the PCI to be used.

In this manner, the DPCCH idle field refers to a TFCI (transport format combination indicator) field or an FBI (feedback information) field. If the user node does not send uplink DPDCH (Dedicated Physical Data Channel), the TFCI field is idle, and the PCI uses the TFCI field; and if the user node does not feed back an FBI, the FBI field is idle, and the PCI uses the FBI field. If the TFCI field and the FBI field are both idle, both fields may be used. It may be understood that the DPCCH periodically adjacent to the PCI to be used may be set according to the calculation time of the user node PCI and the base station processing delay.

By using any one of the above bearing manners, the PCI to be used, CQI, and ACK/NACK may be efficiently borne over the HS-DPCCH in cases where the number of bits corresponding to the PCI increases, and thereby fed back to the base station node. Persons in the art may understand that in a case where the number of bits corresponding to the PCI increases, the specific manners for bearing the feedback information over the HS-DPCCH are not limited to the above four manners.

Figure 2:
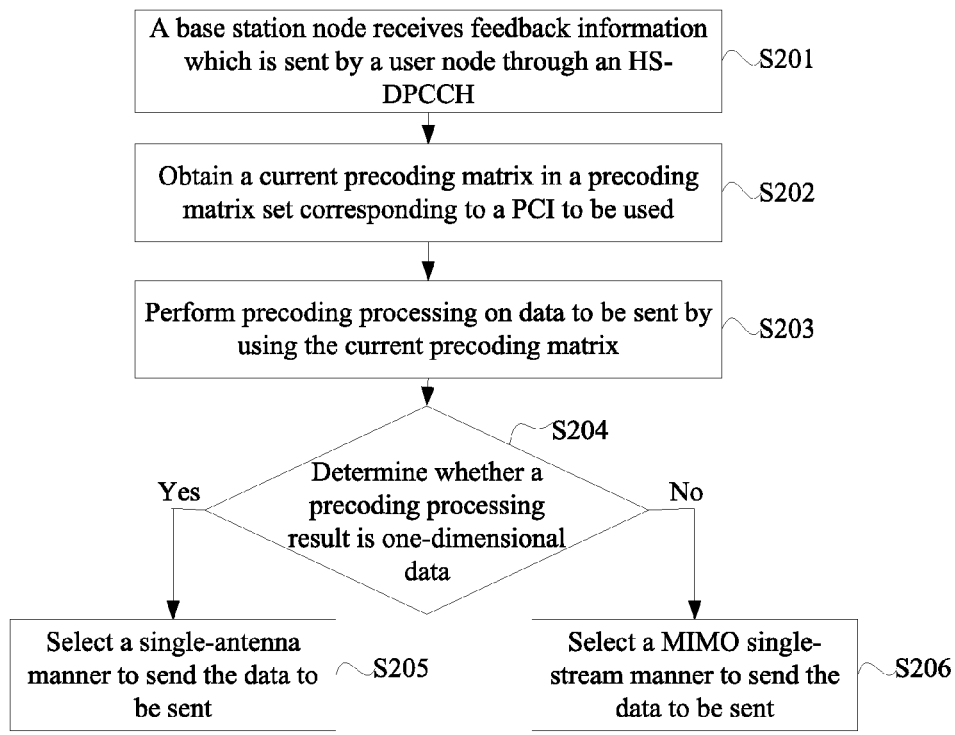
FIG. 2 is a second flowchart of a precoding control indication feedback method according to an embodiment of the present invention.

The following description is made from the view of a base station. A precoding control indication feedback method, as shown in FIG. 2, may include the following steps.

S201. A base station node receives feedback information which is sent by a user node through an HS-DPCCH.

The feedback information includes a PCI to be used, a channel quality indication CQI indicating downlink channel quality, and ACK/NACK indicating a data decoding result.

S202. Obtain a current precoding matrix in a precoding matrix set corresponding to the PCI to be used.

The base station node extracts the PCI to be used from the feedback information from the user node, and obtains the current precoding matrix in the precoding matrix set corresponding to the PCI to be used, where current precoding matrix allows a maximum channel capacity value.

S203. Perform precoding processing on data to be sent by using the current precoding matrix.

The performing precoding processing on the data to be sent by using the current precoding matrix may specifically be multiplying the data to be sent by the current precoding matrix to complete the precoding processing.

S204. Determine whether a precoding processing result is one-dimensional data; if yes, step S205 is to be performed; otherwise, step S206 is to be performed.

S205. Select a single-antenna manner to send the data to be sent.

After the base station node performs precoding processing on the data to be sent by using the determined current precoding matrix, if the precoding processing result is one-dimensional data, it indicates that the precoding matrix to be used is an antenna switching precoding matrix. In such a case, the single-antenna sending manner may need to be used.

S206. Select a MIMO single-stream manner to send the data to be sent.

After the base station node performs precoding processing on the data to be sent by using the determined current precoding matrix, if the precoding processing result is multidimensional data, it indicates that the current precoding matrix is an original precoding matrix in an original precoding protocol. In such a case, transmit antennas corresponding in quantity to the base station node need to be used to send the data to be sent according to the MIMO single-stream manner.

It may be understood that the base station node may also directly determine whether the current precoding matrix corresponding to the PCI to be used is any one of the antenna switching precoding matrices. If the current precoding matrix is an antenna switching precoding matrix, one-dimensional data is obtained after precoding processing by using this precoding matrix, and it is reasonable to directly send the data to be sent according to the single-antenna manner.

In the technical solutions provided by the embodiments of the present invention, antenna switching precoding matrices are added to an original precoding matrix set; when a user node constructs a PCI, all precoding matrices are traversed, and a sequence number of a precoding matrix of a maximum channel capacity is used as a PCI value which is borne over HS-DPCCH together with a CQI and ACK/NACK and sent to a base station node, thereby instructing the base station node to select a MIMO single-stream manner or a single-antenna manner according to situation of a channel to be used to send data. Compared with the prior art, by using the manner of adding the antenna switching precoding matrices, the base station node is enabled to select a data transmission manner suitable for the channel to be used according to the PCI fed back by the user node, thereby efficiently reducing the probabilistic negative gain that may occur on the MIMO single stream compared with the conventional single-transmitting HSDPA, and improving communication quality.

The precoding control indication feedback method provided by the present invention is described in detail by using a 2×2 MIMO system as an example as follows. Assuredly, the application scenario of the solution provided by the present invention is not limited to the 2×2 MIMO system. For example, it may also be applied to a 3×3 MIMO system, and the like.

The 2×2 MIMO system means that a base station node and a user node both have two antennas. In such a case, the MIMO single-stream manner means that when the base station node sends data, two transmit antennas send the same data block at the same time.

In the 2×2 MIMO system, as for the base station node by using the MIMO single-stream manner to send data, because of location changes in two transmit antennas of the base station node or channel quality, there is a big difference between shadow attenuation experienced by the transmit antennas for sending data; or when antenna polarization directions are inconsistent, the receive power on the receiver may be extremely imbalanced, or an extreme scenario may exist where the receiver can receive the power of only one transmit antenna. It results in a probabilistic negative gain on the MIMO single stream compared with a conventional single-transmitting HSDPA, thereby greatly affecting communication quality. The present invention provides a precoding control indication feedback method, which effectively improves communication quality by using a method where the base station node selects a suitable data transmission manner according to channel situation.

Figure 3:
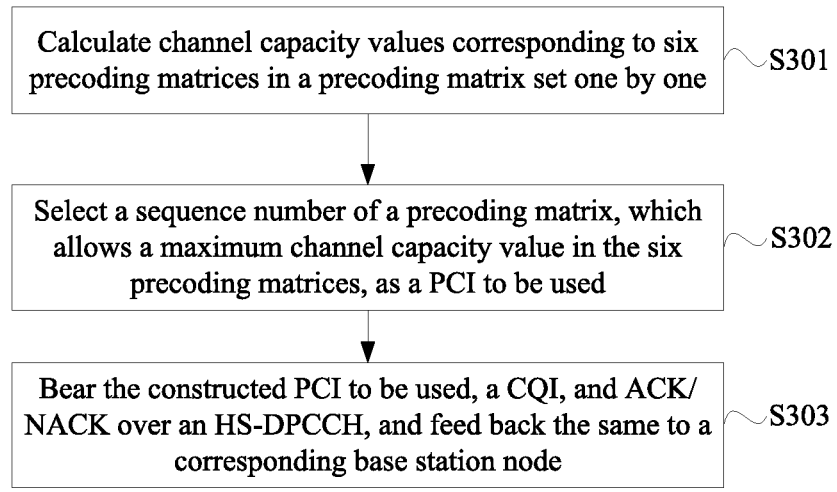
FIG. 3 is a third flowchart of a precoding control indication feedback method according to an embodiment of the present invention.

For the 2×2 MIMO system, the description is made from the view of a user node. A precoding control indication feedback method, as shown in FIG. 3, may include:

S301. Calculate channel capacity values corresponding to 6 precoding matrices in a precoding matrix set one by one.

It should be noted that, in the 2×2 MIMO system, the precoding matrix set preset by negotiating between the user node and the base station node may include:

$$\left[\begin{array}{c}\frac{1}{\sqrt{2}}\\\frac{1+j}{2}\end{array}\right], \left[\begin{array}{c}\frac{1}{\sqrt{2}}\\\frac{1-j}{2}\end{array}\right], \left[\begin{array}{c}\frac{1}{\sqrt{2}}\\\frac{-1+j}{2}\end{array}\right], \left[\begin{array}{c}\frac{1}{\sqrt{2}}\\\frac{-1-j}{2}\end{array}\right], \left[\begin{array}{c}1\\0\end{array}\right], \left[\begin{array}{c}0\\1\end{array}\right]$$

Sequence numbers corresponding to the precoding matrices in the preset precoding matrix set from left to right are 000, 001, 010, 011, 100, and 101, respectively. It may be understood that the way of assigning sequence numbers of the precoding matrices is not limited to the above order, which may be changed to another arrangement order of the precoding matrix set according to actual situations, so that each precoding matrix corresponds to a specific sequence number.

Original precoding matrices in the precoding protocol include:

$$\left[\begin{array}{c}\frac{1}{\sqrt{2}}\\\frac{1+j}{2}\end{array}\right], \left[\begin{array}{c}\frac{1}{\sqrt{2}}\\\frac{1-j}{2}\end{array}\right], \left[\begin{array}{c}\frac{1}{\sqrt{2}}\\\frac{-1+j}{2}\end{array}\right], \left[\begin{array}{c}\frac{1}{\sqrt{2}}\\\frac{-1-j}{2}\end{array}\right]$$

Based on the precoding protocol, newly added antenna switching precoding matrices include:

$$\left[\begin{array}{c}1\\0\end{array}\right], \left[\begin{array}{c}0\\1\end{array}\right]$$

It may be understood that, by using any one original precoding matrix for performing precoding processing, a precoding processing result is two-dimensional data, so that the base station node sends the data to be sent according to the MIMO single-stream manner. By using any one antenna switching precoding matrix for performing precoding processing, a precoding processing result is one-dimensional data, so that according to the single-antenna manner, the base station node sends the data to be sent. Meanwhile, according to an actual application scenario, based on the precoding protocol, it is reasonable to add the above two antenna switching precoding matrices at the same time, or to only add any one of the above two antenna switching precoding matrices.

The user node, after receiving the data and control signaling sent by the base station node, generates ACK/NACK information according to a decoding result; measures downlink channel situation to generate CQI; and may traverse the 6 precoding matrices in the preset precoding matrix set to calculate a channel capacity value to be used corresponding to each precoding matrix. The specific way of calculating a MIMO single-stream channel capacity value may be the manner described in the above embodiment, which indeed is not limited to the above manner and is not described repeatedly here.

S302. Select a sequence number of a precoding matrix, which allows a maximum channel capacity value in the 6 precoding matrices, as a PCI to be used.

The user node, after determining a current the channel capacity corresponding to each precoding matrix, selects a sequence number of a precoding matrix corresponding to a maximum channel capacity value as a precoding control indication PCI to be used. For example, the precoding matrix corresponding to the maximum channel capacity value is:

$$\left[\begin{array}{c}\frac{1}{\sqrt{2}}\\\frac{1-j}{2}\end{array}\right]$$

The sequence number corresponding to this precoding matrix is 001, so the precoding control indication PCI to be used is 001. However, if the precoding matrix corresponding to the maximum channel capacity value is:

$$\left[\begin{array}{c}0\\1\end{array}\right]$$

The sequence number corresponding to this precoding matrix is 101, so the precoding control indication PCI to be used is 101.

S303. Bear the constructed PCI to be used, the CQI, and ACK/NACK over the HS-DPCCH, and feed back the same to the corresponding base station node.

The user node, after constructing the PCI, bears the PCI to be used, together with the CQI and ACK/NACK, over the HS-DPCCH, and feeds back the same to the base station node.

Where there are only the original precoding matrices, the PCI is 2 bit/TTI (Transmission Time Interval, Transmission Time Interval), and is joint-encoded with the CQI to 20 bits and borne over the HS-DPCCH. That is, in such a case, the PCI has 2 bits, which may identify the sequence number of each precoding matrix. Now, two antenna switching precoding matrices are added. In order to allow the total number of bits corresponding to the PCI to identify each precoding matrix in the preset precoding matrix set including the antenna switching precoding matrices, 1 bit needs to be added to the PCI to be used, thereby supporting the expansion of the precoding protocol.

Correspondingly, for the 2×2 MIMO system, the manner for bearing the PCI to be used, the CQI, and ACK/NACK over the HS-DPCCH may specifically include the following.

(1) Keep the existing PCI feedback period of the precoding protocol unchanged, and change the scheme of jointly coding the CQI and the PCI.

Figure 4:
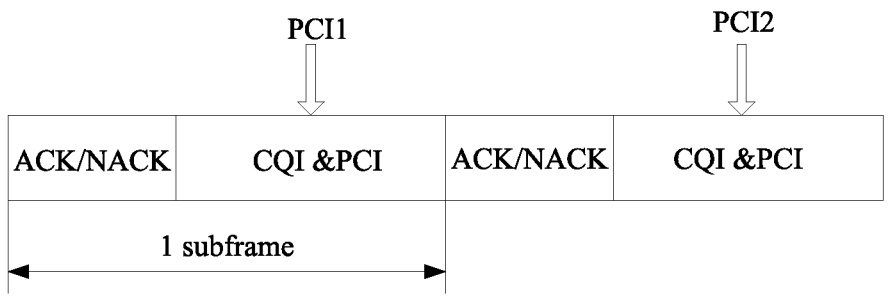
FIG. 4 is a first schematic structural diagram of a precoding control indication PCI borne over an HS-DPCCH according to an embodiment of the present invention.

Persons in the art may understand that, for the MIMO single stream, data types reported in the CQI include typeA and typeB. That is, typeA and typeB appear in turn on the HS-DPCCH. The two types are sent according to a pattern corresponding to a configuration parameter, for example, AABAAB . . . or AABBAABB . . . . Therefore, in this embodiment, in order to ensure that a result of joint coding the CQI and the PCI to be used is still 20 bits, typeA (20,10) corresponding to the MIMO single MIMO may be changed into (20,11), and typeB (20,7) changed to (20,8) for corresponding coding. As shown in FIG. 4, the coding result and ACK/NACK may be borne over the HS-DPCCH according to the original information bearing manner.

The coding process for the optimum coding sequence (b,a)=(20,8) provided in this manner may be cascading the PCI and the CQI to obtain:

$$(a_0 a_1 a_2 a_3 a_4 a_5 a_6 a_7) = (pci_0 pci_1 pci_2 cqi_0 cqi_1 cqi_2 cqi_3 cqi_4) \quad (2),$$

and substituting each element of vector a obtained in the above equation (2) and each element of multiple column vectors selected from the following table 1 into the following formula:

$$b_i = \left( \sum_{n=0}^{1} (a_n \times M_{i,n}) + \sum_{n=2}^{4} (a_n \times M_{i,n+1}) + a_5 \times M_{i,7} + a_6 \times M_{i,8} + a_7 \times M_{i,9} \right) \bmod 2 \quad (3)$$

$$i = 0, \ldots, 19,$$

where $pci_0$ $pci_1$ $pci_2$ represents 3 bits of one PCI, mod 2 operation represents modulo 2, and $M_{i,m}$ is a sequence in the following table 1, $m \in \{0, 1, 3, 4, 5, 7, 8, 9\}$.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 |
| 2 | 0 | 0 | 0 | 1 | 0 | 0 | 0 | 0 | 0 | 0 | 0 |
| 3 | 0 | 0 | 0 | 0 | 1 | 0 | 0 | 0 | 0 | 0 | 0 |
| 4 | 0 | 0 | 0 | 0 | 0 | 1 | 0 | 0 | 0 | 0 | 0 |
| 5 | 0 | 0 | 0 | 0 | 0 | 0 | 0 | 1 | 0 | 0 | 0 |
| 6 | 0 | 0 | 0 | 0 | 0 | 0 | 0 | 0 | 1 | 0 | 1 |
| 7 | 0 | 0 | 0 | 0 | 0 | 0 | 0 | 0 | 0 | 1 | 1 |
| 8 | 1 | 0 | 1 | 0 | 0 | 0 | 1 | 1 | 1 | 0 | 1 |
| 9 | 1 | 1 | 1 | 0 | 1 | 0 | 0 | 1 | 1 | 1 | 1 |
| 10 | 0 | 1 | 1 | 0 | 1 | 0 | 0 | 0 | 1 | 1 | 1 |
| 11 | 1 | 0 | 1 | 1 | 0 | 1 | 0 | 0 | 0 | 1 | 0 |
| 12 | 1 | 1 | 0 | 1 | 1 | 0 | 1 | 0 | 0 | 0 | 0 |
| 13 | 1 | 1 | 1 | 0 | 1 | 1 | 0 | 1 | 0 | 0 | 0 |
| 14 | 0 | 1 | 1 | 1 | 0 | 1 | 1 | 0 | 1 | 0 | 1 |
| 15 | 0 | 0 | 1 | 1 | 1 | 0 | 1 | 1 | 0 | 1 | 0 |
| 16 | 0 | 0 | 0 | 1 | 1 | 1 | 0 | 1 | 1 | 0 | 1 |
| 17 | 1 | 0 | 0 | 0 | 1 | 1 | 1 | 0 | 1 | 1 | 1 |
| 18 | 0 | 1 | 0 | 0 | 0 | 1 | 1 | 1 | 0 | 1 | 0 |
| 19 | 1 | 1 | 1 | 1 | 1 | 1 | 1 | 1 | 1 | 1 | 1 |

Meanwhile, the coding process for the optimum coding sequence (b,a)=(20,11) provided in this manner may be cascading the PCI and the CQI to obtain:

$$(a_0 a_1 a_2 a_3 a_4 a_5 a_6 a_7 a_8 a_9 a_{10}) = (pci_0 pci_1 pci_2 cqi_0 cqi_1 cqi_2 cqi_3 cqi_4 cqi_5 cqi_6 cqi_7) \quad (4),$$

and substituting each element of vector a obtained in the above equation (4) and each element of multiple column vectors selected from the following table 2 into the following formula:

$$b_i = \left( \sum_{n=0}^{9} (a_n \times M_{i,n}) + a_{10} \times M_{i,11} \right) \bmod 2 \quad (5)$$

$$i = 0, \ldots, 19,$$

where $pci_0$ $pci_1$ $pci_2$ represents 3 bits of one PCI, mod 2 operation represents modulo 2, and $M_{i,m}$ is a sequence in the following table 2, $m \in \{1, 2, 3, 4, 5, 6, 7, 8, 9, 11\}$.

TABLE 2

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ |
|---|---|---|---|---|---|---|---|---|---|---|---|---|
| 0 | 1 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 |
| 2 | 0 | 0 | 1 | 0 | 0 | 0 | 0 | 0 | 0 | 0 | 0 | 0 |
| 3 | 0 | 0 | 0 | 0 | 1 | 0 | 0 | 0 | 0 | 0 | 0 | 0 |

TABLE 2-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ |
|---|---|---|---|---|---|---|---|---|---|---|---|---|
| 4 | 0 | 0 | 0 | 0 | 0 | 1 | 0 | 0 | 0 | 0 | 0 | 0 |
| 5 | 0 | 0 | 0 | 0 | 0 | 0 | 0 | 1 | 0 | 0 | 0 | 0 |
| 6 | 0 | 0 | 0 | 0 | 0 | 0 | 0 | 0 | 1 | 0 | 1 | 0 |
| 7 | 0 | 0 | 0 | 0 | 0 | 0 | 0 | 0 | 0 | 1 | 1 | 0 |
| 8 | 1 | 0 | 1 | 0 | 0 | 0 | 1 | 1 | 1 | 0 | 1 | 0 |
| 9 | 1 | 1 | 0 | 1 | 0 | 0 | 0 | 1 | 1 | 1 | 1 | 1 |
| 10 | 0 | 1 | 1 | 0 | 1 | 0 | 0 | 0 | 1 | 1 | 1 | 0 |
| 11 | 1 | 0 | 1 | 1 | 0 | 1 | 0 | 0 | 0 | 1 | 0 | 0 |
| 12 | 1 | 1 | 0 | 1 | 1 | 0 | 1 | 0 | 0 | 0 | 0 | 1 |
| 13 | 1 | 1 | 1 | 0 | 1 | 1 | 0 | 1 | 0 | 0 | 0 | 0 |
| 14 | 0 | 1 | 1 | 1 | 0 | 1 | 1 | 0 | 1 | 0 | 1 | 0 |
| 15 | 0 | 0 | 1 | 1 | 1 | 0 | 1 | 1 | 0 | 1 | 0 | 0 |
| 16 | 0 | 0 | 0 | 1 | 1 | 1 | 0 | 1 | 1 | 0 | 1 | 1 |
| 17 | 1 | 0 | 0 | 0 | 1 | 1 | 1 | 0 | 1 | 1 | 1 | 1 |
| 18 | 0 | 1 | 0 | 0 | 0 | 1 | 1 | 1 | 0 | 1 | 0 | 1 |
| 19 | 1 | 1 | 1 | 1 | 1 | 1 | 1 | 1 | 1 | 1 | 1 | 1 |

Figure 5:
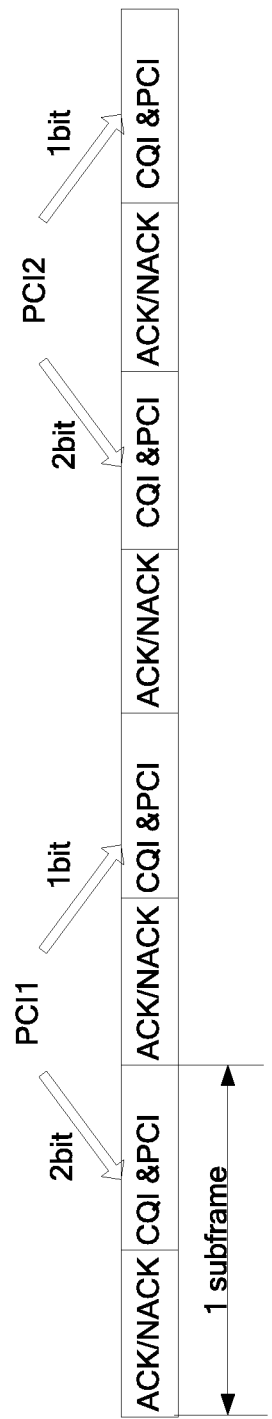
FIG. 5 is a second schematic structural diagram of a precoding control indication PCI borne over an HS-DPCCH according to an embodiment of the present invention.

(2) Keep the scheme of jointly coding the CQI and the PCI in the existing precoding protocol unchanged, and increase the feedback period of the PCI to be used. As shown in FIG. 5, the manner may specifically be:

Three bits corresponding to a valid PCI1 is distributed in two consecutive original CQI/PCI joint coding. That is, 2 bits of a 3-bit PCI1 to be used and the CQI are joint encoded according to specifications of the original precoding protocol, and are borne over one of two contiguous TTI. Meanwhile, because only 1 bit of the PCI to be used remains, 1 bit (agreed to be 1 or 0 in advance) is supplemented to make a complete 2-bit original PCI, which is then joint encoded with the CQI according to the specifications of the original precoding protocol, and are borne over another one of the two contiguous TTI. In such cases, the minimum valid period may be 4 ms.

Further, each joint coding result and ACK/NACK are borne over the HS-DPCCH according to the original information bearing manner.

Figure 6:
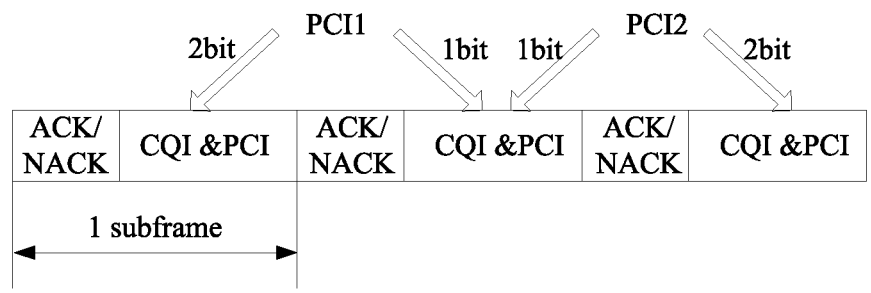
FIG. 6 is a third schematic structural diagram of a precoding control indication PCI borne over an HS-DPCCH according to an embodiment of the present invention.

(3) Keep the scheme of jointly coding the CQI and the PCI in the existing precoding protocol unchanged, shorten the feedback period of the PCI to be used to the utmost, and feed back the PCI to be used efficiently. As shown in FIG. 6, the manner may specifically be as follows.

Six-bit data of two valid PCIs to be used, namely, PCC1 and PCI2, is distributed in three consecutive original CQI/PCI joint coding, which specifically is: jointly coding 2 bits in the 3 bits of the two PCIs and the CQI separately according to the original precoding protocol, and then bearing the same over two of the three contiguous TTIs; and making 2 bits by using the respective remaining 1 bit of the two PCIs and performing joint coding on them with the CQI according to the original precoding protocol, and then bearing the same over the remaining one of the three contiguous TTI.

Further, each joint coding result and ACK/NACK are borne over the HS-DPCCH according to the original information bearing manner.

Figure 7:
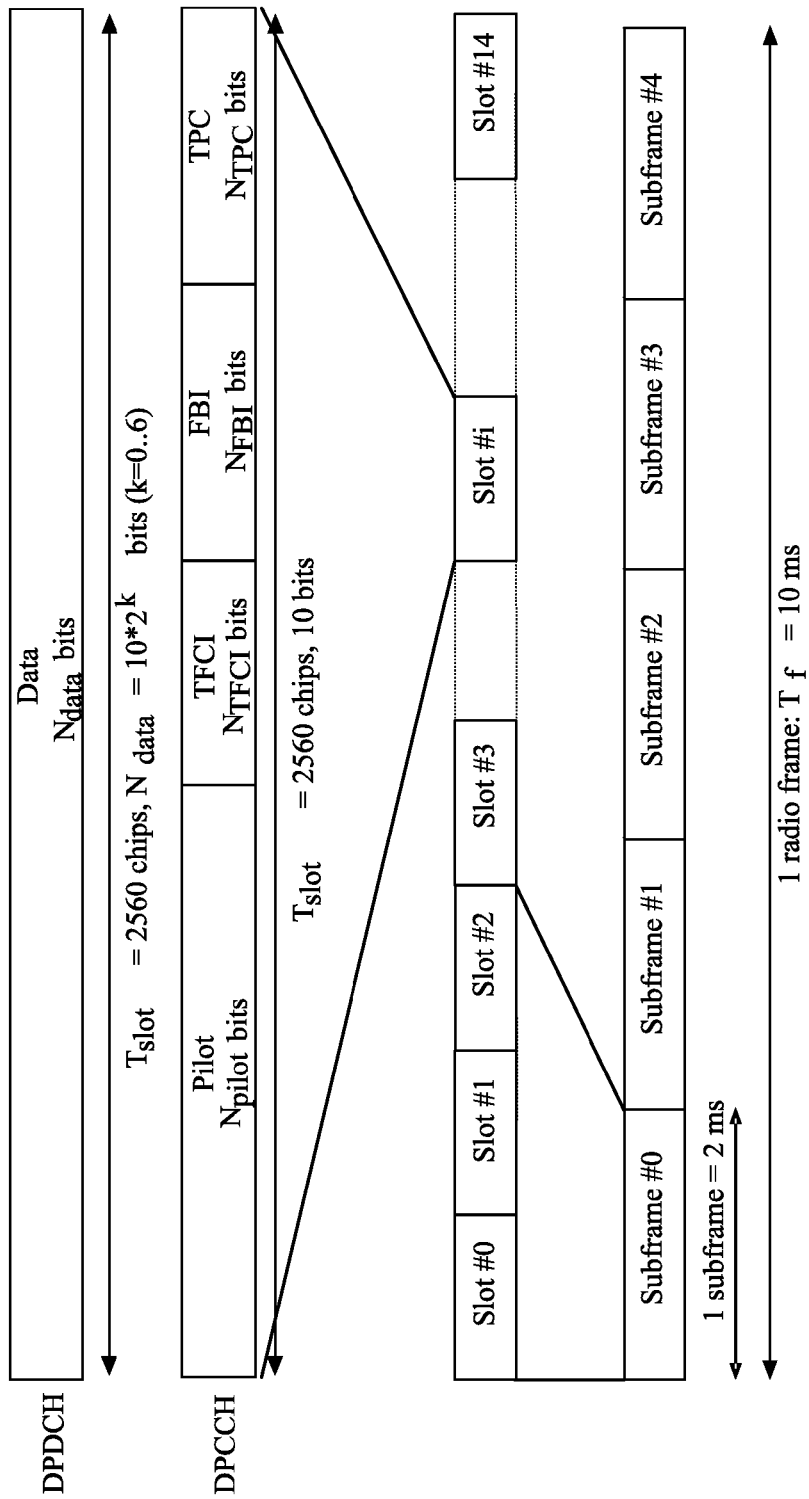
FIG. 7 is a fourth schematic structural diagram of a precoding control indication PCI borne over an HS-DPCCH according to an embodiment of the present invention.
Figure 8:
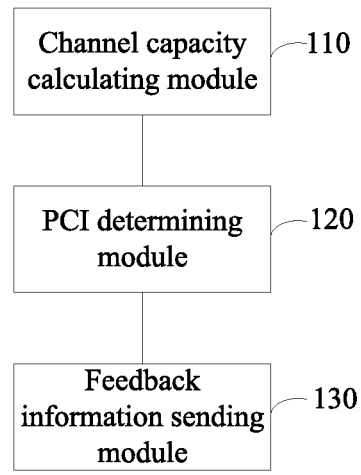
FIG. 8 is a schematic structural diagram of a precoding control indication feedback system in a user equipment according to an embodiment of the present invention.
Figure 9:
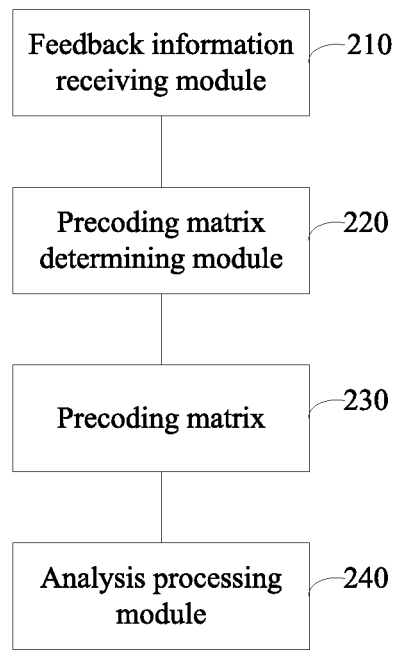
FIG. 9 is a schematic structural diagram of a data precoding system in a base station according to an embodiment of the present invention.

(4) Keep the scheme of jointly coding the CQI and the PCI in the existing precoding protocol unchanged, sufficiently use protocol field resources, and feed back the PCI to be used efficiently. As shown in FIG. 7, the manner may specifically be as follows.

Perform joint coding on 2 bits of a 3-bit PCI to be used the CQI according to the original CQI/PCI joint coding manner, bear a joint coding result and ACK/NACK over the HS-DPCCH according to the original information bearing manner, and meanwhile, bear a remaining bit of the PCI to be used over an idle field of a DPCCH periodically adjacent to the PCI to be used.

It may be understood that, if the user node does not send uplink DPDCH, the TFCI field is idle, and the PCI uses the TFCI field; if the user node does not feed back an FBI, the FBI field is idle, and the PCI uses the FBI field. If the TFCI field and the FBI field are both idle, both fields may be used.

Considering comprehensively the PCI calculation time of the terminal and the base station processing time delay, the DPCCH periodically adjacent to the PCI to be used is defined as a DPCCH time slice overlapping a time span of a subframe on which the PCI to be used is located. A periodic difference range between the overlapping DPCCH time slice and the initial DPCCH time slice may be:

$$\left\lfloor \frac{m \times 256 \text{ chips}}{2560 \text{ chips}} \right\rfloor \sim \left\lceil \frac{m \times 256 \text{ chips} + 2 \times 2560 \text{ chips}}{2560 \text{ chips}} \right\rceil;$$

where $\lfloor \ \rfloor$ represents rounding down, and $\lceil \ \rceil$ represents rounding up.

The precoding protocol specifies that the periodic difference between HS-DPCCH and DPCCH is m*256 chip, m=(TTX_diff/256)+101, TTX_diff=0, 256 . . . 38144. The overlapping DPCCH time slice is 3 slots at least and 4 slots at most. Preferentially, the DPCCH time slice which is located entirely on the subframe time span of the PCI is selected.

Correspondingly, for the 2×2 MIMO system, from the point of the base station node, the base station node extracts the PCI to be used from the received user feedback information, determines the current precoding matrix corresponding to the PCI to be used, and performs precoding processing on the data to be sent by using the determined current precoding matrix. It may be understood that if the current precoding matrix is any one of the original precoding matrices, the precoding processing result of processing the data to be sent by using the current precoding matrix is two-dimensional data. In such a case, the base station node needs to select the MIMO single-stream manner to send the data to be sent. If the current precoding matrix is any one of the antenna switching precoding matrices, the precoding processing result of processing the data to be sent by using the current precoding matrix is one-dimensional data. In such a case, the base station node needs to send the data to be sent by using the single-antenna manner.

For the 2×2 MIMO system, the MIMO precoding matrix set is expanded, antenna switching precoding matrices are added, and the user node may traverse the expanded precoding matrix set and selects the sequence number corresponding to the precoding matrix allowing the maximum channel capacity as the PCI to be reported, so that the base station node may select an optimum manner from the MIMO single-stream manner or single-antenna manner to send the data to be sent, thereby achieving switching from the MIMO single-stream manner to the single-antenna manner when the two transmit antenna powers received by the user node are imbalanced, reducing probabilistic negative gain of MIMO compared with conventional single-transmission HSDPA, and improving communication quality. It may be understood that after the powers of the two transmit antennas received by the UE are balanced, the single-antenna manner may be switched to the MIMO single-stream manner according to the selected current precoding matrix.

Based on the method embodiments described above, persons skilled in the art may clearly understand that the present invention may be implemented by software with necessary common hardware platform. Specifically, the present invention may also be implemented by only hardware. However, the former is an exemplary implementation manner. Based on such understanding, the essence of the technical solution of the present invention or the part of that makes a contribution to the prior art may be implemented in the form of a software product. The computer software product is stored in a storage medium, and includes multiple instructions to enable computer equipment (which may be a personal computer, a server, or a network device) to execute all or partial steps of the method described in embodiments of the present invention. The storage medium includes various mediums capable of storing the program code such as a read-only memory (ROM), a random access memory (RAM), a magnetic disk, or a CD-ROM.

Corresponding to the above method embodiments, embodiments of the present invention further provide a user equipment which includes a precoding control indication feedback system.

The precoding control indication feedback system includes a number of modules. A channel capacity calculating module 110 is configured to calculate channel capacity values corresponding to precoding matrices in a precoding matrix set. A PCI determining module 120 is configured to use a sequence number of a precoding matrix corresponding to a maximum channel capacity value as a precoding control indication PCI to be used. A feedback information sending module 130 is configured to bear the PCI to be used, a channel quality indication CQI indicating downlink channel quality, and ACK/NACK indicating a data decoding result over an uplink high-speed dedicated physical control channel HS-DPCCH, and to feed back the same to a corresponding base station node to instruct the base station node to select a MIMO single-stream manner or a single-antenna manner to send data to be sent. The precoding matrix set includes antenna switching precoding matrices and original precoding matrices in a precoding protocol. The antenna switching precoding matrices enable a result of precoding processing performed by the base station node on the data to be sent to be one-dimensional data, thereby using the single-antenna manner to send the data to be sent.

When the PCI is being constructed, the precoding control indication feedback system in the user equipment may traverse all precoding matrices in the precoding matrix set which includes antenna switching precoding matrices, calculate the channel capacity value to be used corresponding to each precoding matrix, use a sequence of a precoding matrix allowing a maximum channel capacity value as the PCI value, and bear the same together with the CQI and ACK/NACK over the HS-DPCCH to send the same to the base station, thereby instructing the base station to select an optimum manner from the MIMO single-stream manner and single-antenna manner according to the PCI to be used to send the data to be sent, so as to reduce probabilistic negative gain of the MIMO single stream compared with the conventional single-transmission HSDPA, and improve communication quality.

Further, the feedback information sending module 130 can be configured to use a preset CQI/PCI joint coding manner in which the number of bits after joint coding of the CQI and the PCI to be used remains unchanged, to perform joint coding on the CQI and the PCI to be used, and bear a coding result and ACK/NACK over the HS-DPCCH according to an original information bearing manner.

Alternately, the fee back information sending module 130 can be configured to distribute bits corresponding to one PCI to be used into multiple consecutive original CQI/PCI joint coding according to a preset ratio, and bear each joint coding result and ACK/NACK over the HS-DPCCH according to the original information bearing manner.

Alternatively, the feed back information sending module 130 can be configured to distribute bits corresponding to two PCIs to be used into multiple consecutive original CQI/PCI joint coding in a unit of the original number of bits of the PCI, and bear each joint coding result and ACK/NACK over the HS-DPCCH according to the original information bearing manner.

Alternatively, the feed back information sending module 130 can configured to perform joint coding on the original number of bits of one PCI in the PCI to be used and the CQI according to the original CQI/PCI joint coding manner, bear the joint coding result and ACK/NACK over the HS-DPCCH according to the original information bearing manner, and meanwhile, bear remaining bits of the PCI to be used over an idle field of a DPCCH periodically adjacent to the PCI to be used. The idle field of the DPCCH includes a transmission format combination indication TFCI field and/or a feedback information FBI field.

It may be understood that the feedback information sending module may bear the PCI to be used, the CQI, and ACK/NACK over the HS-DPCCH by using other manners, which is not limited to the above four manners.

Further, the channel capacity calculating module 110 includes a number of units. A signal-to-noise ratio determining unit is configured to determine a signal-to-noise ratio SNR corresponding to a precoding matrix in the precoding matrix set in a current channel. A channel capacity determining unit is configured to substitute the signal-to-noise ratio SNR into a MIMO single stream channel capacity formula to determine a channel capacity value corresponding to the precoding matrix. The MIMO single-stream channel capacity formula is:

$$C_i = \log_2(1+\text{SNR})$$

where $C_i$ is a channel capacity value corresponding to a precoding matrix whose sequence number is i, and $\text{SNR}_i$ is an SNR corresponding to the precoding matrix whose sequence number is i.

It may be understood that, other ways may be selected according to actual situations as the ways for the channel capacity calculating module to calculate the channel capacity to be used corresponding to the precoding matrix, which is not limited to the above way.

Meanwhile, embodiments of the preset invention further provide a base station, including a data precoding system. The data precoding system includes a number of modules. A feedback information receiving module 210 is configured to receive feedback information which is sent by a user node over an uplink high-speed dedicated physical control channel HS-DPCCH. The feedback information includes a PCI to be used, a channel quality indication CQI indicating downlink channel quality, and ACK/NACK indicating a data decoding result. A precoding matrix determining module 220 is configured to obtain a current precoding matrix in a precoding matrix set corresponding to the PCI to be used. A precoding module 230 is configured to perform precoding processing on data to be sent by using the current precoding matrix. An analysis processing module 240 is configured to select, when a precoding processing result is one-dimensional data, a single-antenna manner to send the data to be sent. Otherwise the module 240 can select a MIMO single-stream manner to send the data to be sent.

The data precoding system in the base station, after receiving the PCI to be used sent by the user equipment, may perform precoding processing on the data to be sent according to the precoding matrix corresponding to the PCI to be used, and in a case where the precoding processing result is one-dimensional data, select the single-antenna manner to send the data to be sent; otherwise, select the MIMO single-stream manner to send the data to be sent. The base station selects a data sending manner suitable to the channel according to the PCI to be used fed back by the user equipment, thereby efficiently reducing a probabilistic negative gain of the MIMO single stream compared with the conventional single transmission HSDPA and improving communication quality.

Further, the precoding module 230 is specifically configured to multiply the data to be sent by the current precoding matrix to complete the precoding processing.

For apparatus embodiments, because they basically correspond to method embodiments, reference may be made to the method embodiments for relevant parts. The described apparatus or system embodiments are merely exemplary. The units described as separate parts may or may not be physically separate, and parts displayed as units may or may not be physical units, may be located in one position, or may be distributed on a plurality of network elements. A part of or all of the modules may be selected according to actual need to achieve the objectives of the solutions of the embodiments. Persons of ordinary skills in the art may understand and implement the embodiments without creative efforts.

In the embodiments provided by the present application, it should be understood that the system, apparatus, and method disclosed therein, without departing from the spirit and scope of the present application, may be implemented in other ways. The available embodiments are merely illustrative examples, and shall not be construed as limitations. The specific content presented herein shall not limit the purpose of the present application. For example, the division of units or subunits is merely logical function division, and there are other division manners in actual implementations. For example, multiple units or multiple subunits are combined together. In addition, multiple units may or components may be combined or integrated into another system, or some features may be ignored, or not be performed.

In addition, the schematic diagrams for illustrating the system, apparatus, method, and different embodiments may be combined or integrated with another system, module, technology, or method without departing from the scope of the present application. In another aspect, the coupling, direct coupling, or communication connection therebetween which is displayed or discussed may be indirect coupling or communication connection of interfaces, apparatuses, or units, and may be electrical, mechanical, or in other forms.

The foregoing descriptions are merely specific embodiments of the present invention. It should be noted that various improvements and modifications made by persons of ordinary skills in the art within the principle of the present invention shall fall within the protection scope of the present invention.

What is claimed is:

1. A precoding control indication feedback method, comprising:
    calculating channel capacity values corresponding to precoding matrices in a precoding matrix set, wherein a channel capacity value corresponding to a precoding matrix;
    using a sequence number of a precoding matrix corresponding to a maximum channel capacity value as a precoding control indication (PCI) to be used;
    bearing the PCI to be used, a channel quality indication (CQI) indicating downlink channel quality, and ACK/NACK indicating a data decoding result over an uplink high-speed dedicated physical control channel (HS-DPCCH); and
    feeding back the PCI, the CQI and the ACK/NACK to a corresponding base station node to instruct the base station node to select a multiple input multiple output (MIMO) single-stream manner or a single-antenna manner to send data to be sent;
    wherein the precoding matrix set comprises antenna switching precoding matrices and original precoding matrices in a precoding protocol; and
    wherein the antenna switching precoding matrices enable a result of precoding processing performed by the base station node on the data to be sent to be one-dimensional data, thereby using the single-antenna manner to send the data to be sent.

2. The method according to claim 1, wherein bearing the PCI to be used, the CQI indicating downlink channel quality, and the ACK/NACK indicating data decoding result comprises using a preset CQI/PCI joint coding manner in which the number of bits after joint coding of the CQI and the PCI to be used remains unchanged, to perform joint coding on the CQI and the PCI to be used and bearing a coding result and ACK/NACK over the HS-DPCCH according to an original information bearing manner.

3. The method according to claim 2, wherein calculating the channel capacity values corresponding to precoding matrices in the precoding matrix set comprises;
    determining a signal-to-noise ratio (SNR) corresponding to a precoding matrix in the precoding matrix set in the current channel;
    substituting the SNR into a MIMO single-stream channel capacity formula to determine a channel capacity value corresponding to the precoding matrix;
    wherein the MIMO single-stream channel capacity formula is:

$$C_i = \log_2(1 + SNR_i)$$

wherein $C_i$ is a channel capacity value corresponding to a precoding matrix whose sequence number is i, and $SNR_i$ is an SNR corresponding to the precoding matrix whose sequence number is i.

4. The method according to claim 1, wherein bearing the PCI to be used, the CQI indicating downlink channel quality, and the ACK/NACK indicating data decoding result comprises distributing bits corresponding to one PCI to be used into multiple consecutive original CQI/PCI joint coding according to a preset ratio, and bearing each joint coding result and ACK/NACK over the HS-DPCCH according to the original information bearing manner.

5. The method according to claim 4, wherein calculating the channel capacity values corresponding to precoding matrices in the precoding matrix set comprises;
determining a signal-to-noise ratio (SNR) corresponding to a precoding matrix in the precoding matrix set in the current channel;
substituting the SNR into a MIMO single-stream channel capacity formula to determine a channel capacity value corresponding to the precoding matrix; and
wherein the MIMO single-stream channel capacity formula is:

$$C_i=\log_2(1+SNR_i)$$

where $C_i$ is a channel capacity value corresponding to a precoding matrix whose sequence number is i, and $SNR_i$ is an SNR corresponding to the precoding matrix whose sequence number is i.

6. The method according to claim 1, wherein bearing the PCI to be used, the CQI indicating downlink channel quality, and the ACK/NACK indicating data decoding result comprises distributing bits corresponding to two PCIs to be used into multiple consecutive original CQI/PCI joint coding in a unit of the original number of bits of the PCI, and bearing each joint coding result and ACK/NACK over the HS-DPCCH according to the original information bearing manner.

7. The method according to claim 6, wherein calculating the channel capacity values corresponding to precoding matrices in the precoding matrix set comprises;
determining a signal-to-noise ratio (SNR) corresponding to a precoding matrix in the precoding matrix set in the current channel;
substituting the SNR into a MIMO single-stream channel capacity formula to determine a channel capacity value corresponding to the precoding matrix;
wherein the MIMO single-stream channel capacity formula is:

$$C_i=\log_2(1+SNR_i)$$

where $C_i$ is a channel capacity value corresponding to a precoding matrix whose sequence number is i, and $SNR_i$ is an SNR corresponding to the precoding matrix whose sequence number is i.

8. The method according to claim 1, wherein bearing the PCI to be used, the CQI indicating downlink channel quality, and the ACK/NACK indicating data decoding result comprises performing joint coding on the original number of bits of one PCI in the PCI to be used and the CQI according to the original CQI/PCI joint coding manner, bearing a joint coding result and ACK/NACK over the HS-DPCCH according to the original information bearing manner, and meanwhile, bearing remaining bits of the PCI to be used over an idle field of a DPCCH periodically adjacent to the PCI to be used, wherein the idle field of the DPCCH comprises a transmission format combination indication (TFCI) field and/or a feedback information (FBI) field.

9. The method according to claim 8, wherein calculating the channel capacity values corresponding to precoding matrices in the precoding matrix set comprises;
determining a signal-to-noise ratio (SNR) corresponding to a precoding matrix in the precoding matrix set in the current channel;
substituting the SNR into a MIMO single-stream channel capacity formula to determine a channel capacity value corresponding to the precoding matrix;
wherein the MIMO single-stream channel capacity formula is:

$$C_i=\log_2(1+SNR_i)$$

where $C_i$ is a channel capacity value corresponding to a precoding matrix whose sequence number is i, and $SNR_i$ is an SNR corresponding to the precoding matrix whose sequence number is i.

10. The method according to claim 1, wherein the method is performed in a multiple input multiple output (MIMO) system having two transmit antennas and wherein the antenna switching precoding matrices comprise:

$$\begin{bmatrix}1\\0\end{bmatrix} \text{ and/or } \begin{bmatrix}0\\1\end{bmatrix}.$$

11. A precoding control indication feedback method, comprising:
receiving feedback information which is sent by a user node over an uplink high-speed dedicated physical control channel (HS-DPCCH), wherein the feedback information comprises a precoding control indication (PCI) to be used, a channel quality indication (CQI) indicating downlink channel quality, and ACK/NACK indicating a data decoding result; obtaining a current precoding matrix in a precoding matrix set corresponding to the PCI to be used;
performing precoding processing on data to be sent by using the current precoding matrix;
and selecting a single-antenna manner to send the data to be sent when a precoding processing result is one-dimensional data;
wherein using the current precoding matrix to perform precoding processing on the data to be sent comprises multiplying the data to be sent by the current precoding matrix to complete the precoding processing.

12. A user equipment, comprising a precoding control indication feedback system, wherein the precoding control indication feedback system comprises:
a channel capacity calculating module, configured to calculate channel capacity values corresponding to precoding matrices in a precoding matrix set, wherein a channel capacity value corresponds to a precoding matrix;
a precoding control indication (PCI) determining module, configured to use a sequence number of a precoding matrix corresponding to a maximum channel capacity value as a PCI to be used; and
a feedback information sending module, configured to bear the PCI to be used, a channel quality indication (CQI) indicating downlink channel quality, and ACK/NACK indicating a data decoding result over an uplink high-speed dedicated physical control channel (HS-DPCCH), and to feed back the PCI, the CQI and the ACK/NACK to a corresponding base station node to instruct the base station node to select a multiple input multiple output (MIMO) single-stream manner or a single-antenna manner to send data to be sent;
wherein the precoding matrix set comprises antenna switching precoding matrices and original precoding matrices in a precoding protocol; and
wherein the antenna switching precoding matrices enable a result of precoding processing performed by the base station node on the data to be sent to be one-dimensional data, thereby using the single-antenna manner to send the data to be sent.

13. The user equipment according to claim 12, wherein the feedback information sending module is configured to use a preset CQI/PCI joint coding manner in which the number of bits after joint coding of the CQI and the PCI to be used remains unchanged, to perform joint coding on the CQI and the PCI to be used, and bear a coding result and ACK/NACK over the HS-DPCCH according to an original information bearing manner.

14. The user equipment according to claim 13, wherein the channel capacity calculating module comprises:
- a signal-to-noise ratio determining unit, configured to determine a signal-to-noise ratio SNR corresponding to a precoding matrix in the precoding matrix set in a current channel;
- a channel capacity determining unit, configured to substitute the signal-to-noise ratio SNR into a MIMO single stream channel capacity formula to determine a channel capacity value corresponding to the precoding matrix; and
- wherein the MIMO single-stream channel capacity formula is:

$$C_i = \log_2(1 + SNR_i)$$

where $C_i$ is a channel capacity value corresponding to a precoding matrix whose sequence number is i, and $SNR_i$ is an SNR corresponding to the precoding matrix whose sequence number is i.

15. The user equipment according to claim 12, wherein the feedback information sending module is configured to distribute bits corresponding to one PCI to be used into multiple consecutive original CQI/PCI joint coding according to a preset ratio, and bear each joint coding result and ACK/NACK over the HS-DPCCH according to the original information bearing manner.

16. The user equipment according to claim 12, wherein the feedback information sending module is configured to distribute bits corresponding to two PCIs to be used into multiple consecutive original CQI/PCI joint coding in a unit of the original number of bits, and bear each joint coding result and ACK/NACK over the HS-DPCCH according to the original information bearing manner.

17. The user equipment according to claim 12, wherein the feedback information sending module is configured to perform joint coding on the original number of bits of one PCI in the PCI to be used and the CQI according to the original CQI/PCI joint coding manner, bear a joint coding result and ACK/NACK over the HS-DPCCH according to the original information bearing manner, and meanwhile, bear remaining bits of the PCI to be used over an idle field of a DPCCH periodically adjacent to the PCI to be used, wherein the idle field of the DPCCH comprises a transmission format combination indication (TFCI) field and/or a feedback information (FBI) field.

18. A base station, comprising a data precoding system, wherein the data precoding system comprises:
- a feedback information receiving module, configured to receive feedback information that is sent by a user node over an uplink high-speed dedicated physical control channel (HS-DPCCH), wherein the feedback information comprises a precoding control indication (PCI) to be used, a channel quality indication (CQI) indicating downlink channel quality, and ACK/NACK indicating a data decoding result;
- a precoding matrix determining module, configured to obtain a current precoding matrix in a precoding matrix set corresponding to the PCI to be used;
- a precoding module, configured to perform precoding processing on data to be sent by using the current precoding matrix; and an analysis processing module, configured to select, when a precoding processing result is one-dimensional data, a single-antenna manner to send the data to be sent;
- wherein the precoding module is configured to multiply the data to be sent by the current precoding matrix to complete the precoding processing.

\* \* \* \* \*